(12) United States Patent
Lo

(10) Patent No.: US 8,608,325 B2
(45) Date of Patent: Dec. 17, 2013

(54) FOCUSING MOUNT

(75) Inventor: Tak Sau Anthony Lo, Kowloon (HK)

(73) Assignee: Loreo Asia Ltd., Kowloon (HK)

( * ) Notice: Subject to any disclaimer, the term of this patent is extended or adjusted under 35 U.S.C. 154(b) by 90 days.

(21) Appl. No.: 12/931,212

(22) Filed: Jan. 27, 2011

(65) Prior Publication Data

US 2011/0188136 A1 Aug. 4, 2011

(30) Foreign Application Priority Data

Jan. 29, 2010 (GB) .................................. 1001451.2

(51) Int. Cl.
| | |
|---|---|
| G02B 5/08 | (2006.01) |
| G02B 21/22 | (2006.01) |
| G02B 27/22 | (2006.01) |
| G03B 35/00 | (2006.01) |
| G06K 9/00 | (2006.01) |

(52) U.S. Cl.
USPC ........... 359/862; 359/376; 359/462; 359/823; 396/324; 396/331; 382/154

(58) Field of Classification Search
USPC ......... 359/823, 663, 629, 639, 633, 470, 462, 359/465, 471, 364, 365, 367, 376, 482, 850, 359/857, 859, 862, 871, 872, 875, 882; 352/40, 43, 58, 60, 86, 140; 396/140, 396/141, 143, 152, 324, 326, 331; 356/16, 356/391; 353/8; 385/17

See application file for complete search history.

(56) References Cited

U.S. PATENT DOCUMENTS

| | | | | |
|---|---|---|---|---|
| 2,403,733 | A * | 7/1946 | Mainardi et al. | 396/331 |
| 2,612,818 | A * | 10/1952 | Jackson | 353/8 |
| 2,647,318 | A * | 8/1953 | Grondona | 33/20.4 |
| 2,803,179 | A * | 8/1957 | Donaldson | 396/326 |
| 2,918,855 | A * | 12/1959 | Wilkenson | 396/141 |
| 3,515,469 | A * | 6/1970 | Winzenburg | 352/40 |
| 3,516,725 | A * | 6/1970 | Ratliff, Jr. | 359/462 |
| 3,551,036 | A * | 12/1970 | Bielusici | 352/60 |
| 4,099,880 | A * | 7/1978 | Kano | 356/611 |
| 4,437,745 | A * | 3/1984 | Hajnal | 396/331 |
| 4,687,310 | A * | 8/1987 | Cuvillier | 396/327 |
| 6,643,396 | B1 * | 11/2003 | Hendriks et al. | 382/154 |
| 6,721,500 | B2 * | 4/2004 | Perisic | 396/331 |
| 7,181,136 | B2 * | 2/2007 | Perisic | 396/331 |

* cited by examiner

*Primary Examiner* — Loha Ben

(74) *Attorney, Agent, or Firm* — D. Peter Hochberg; Sean F. Mellino; Richard A. Wolf

(57) ABSTRACT

A focusing mount includes a focusing frame fixed to a focus tube with at least one lens having an optical axis which is connected to a constraining frame by prismatic joints for enabling movement of the focusing mount along the optical axis without any twisting, lateral, rotational or swing movements.

3 Claims, 16 Drawing Sheets

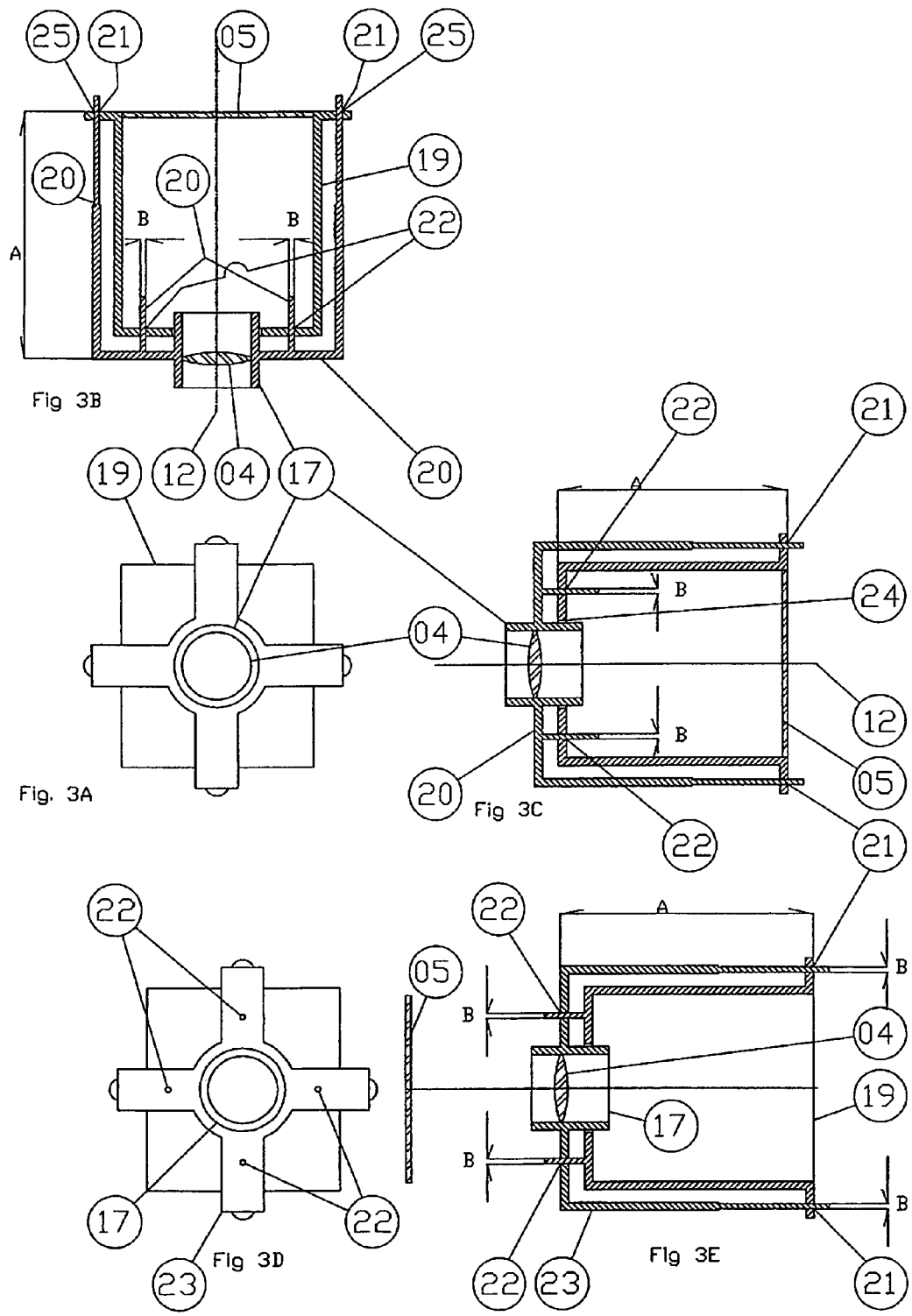

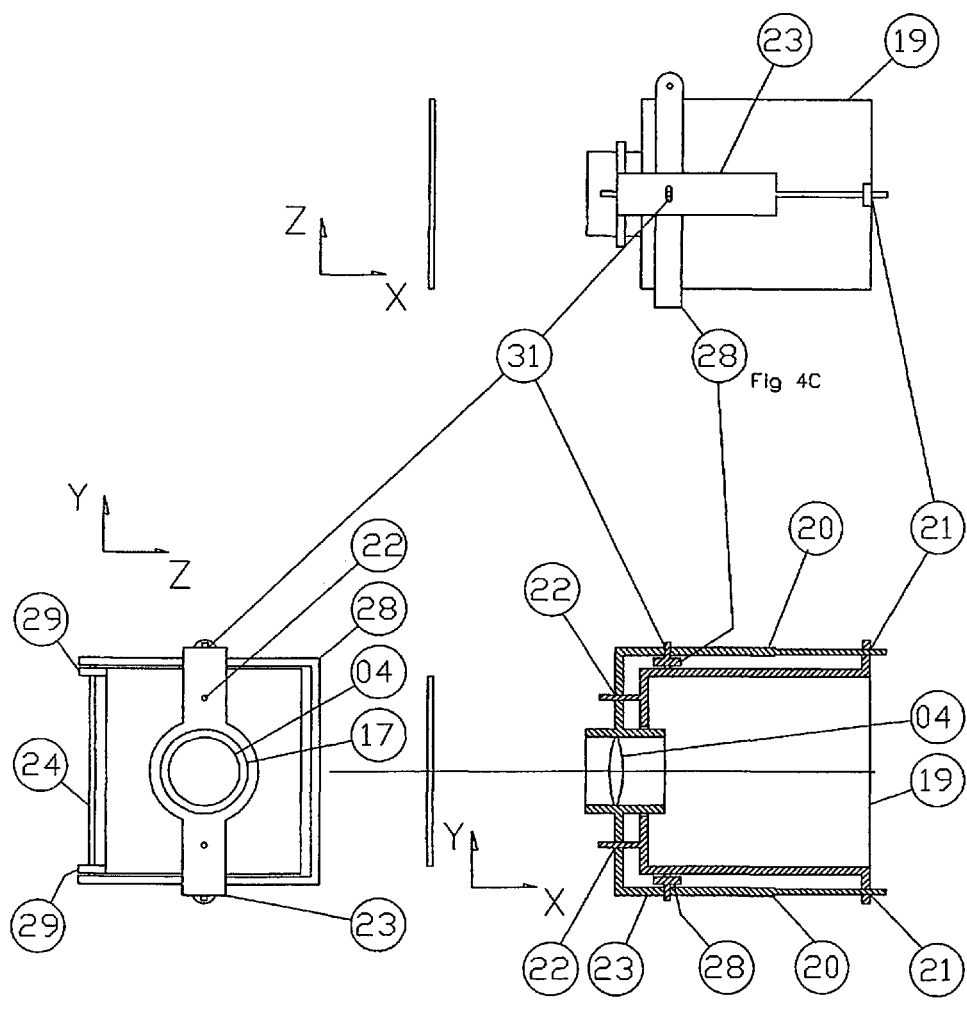

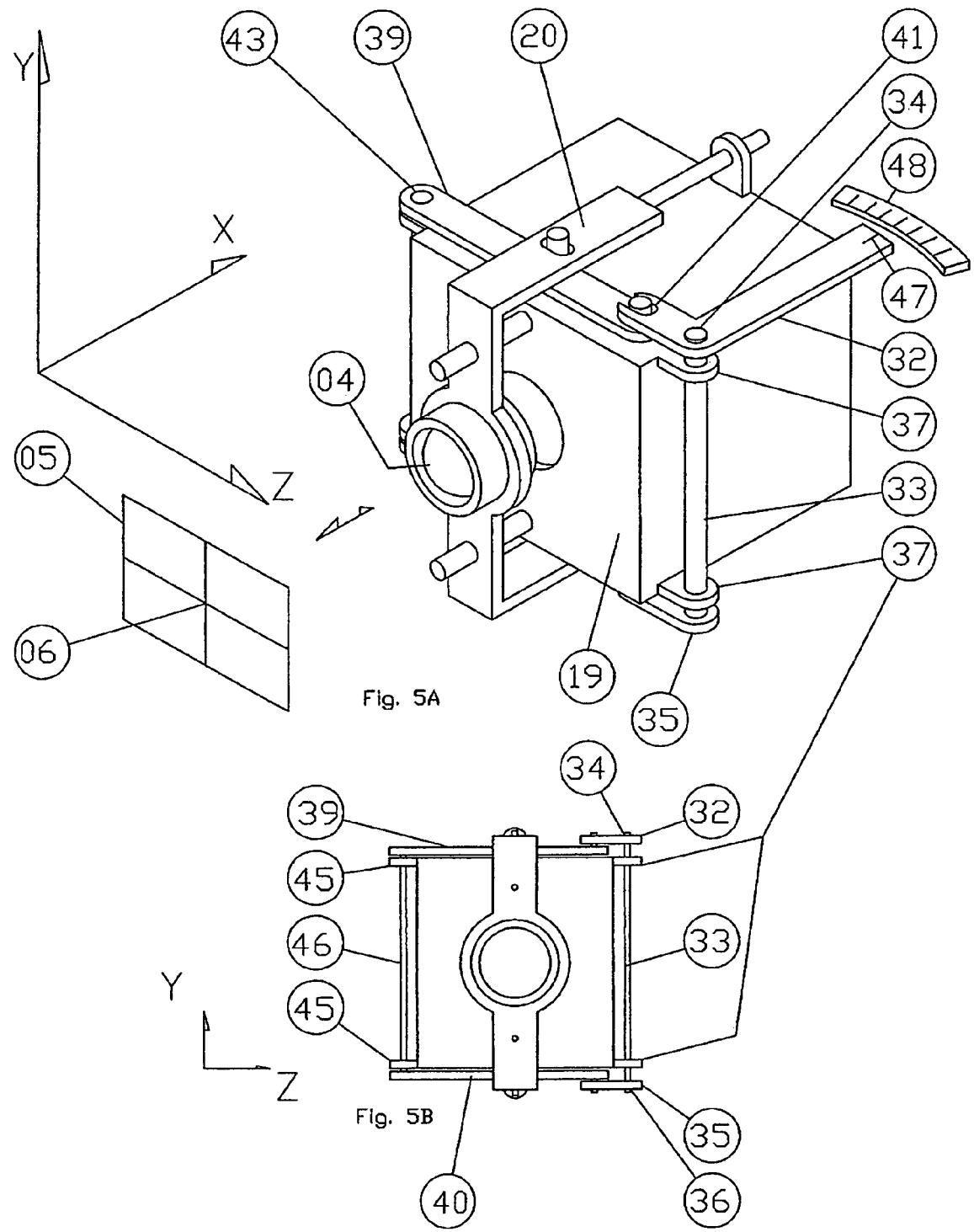

FOCUSING MOUNT

BACKGROUND OF THE INVENTION

1. Field of the Invention

This invention relates to an improved lens mounting system which provides all the benefits of a simple sliding tube but without the associated drawbacks, and more particularly to a focusing mechanism which moves a focusing frame along the optical axis of each lens system linearly by constraining lateral, rotational and swing movements.

2. Description of the Prior Art

There are many ways to focus a lens. This invention concerns the focusing of a lens by means of mechanically changing its position along a fixed path, which maintains the orientation of the lens and follows the optical axis of the lens. This movement may be achieved by manual operation, or it can be motorized. This invention does not cover methods which involve using electronic or other means to change the shape or optical properties of a lens to achieve change in focus.

In an imaging device, when a lens is moved along its central optical axis, it is desirable for it not to shift or tilt with respect to this axis. This is because an imaging device requires an image capturing film or sensor to be placed in a fixed position at a predetermined focal plane. If the lens tilts or shifts, its optical axis and focal plane will tilt or shift with it. For conventional devices, it is not practical to move the image capturing sensor in concert with any tilt or shift of the lens. Any uncontrolled shifting or tilting will degrade the quality of the focus. Even a small tilt in the orientation of the lens will result in an image becoming blurred even when the lens has been moved to its correct point of focus on the optical axis. This means that the lens will effectively have to move along one optical axis which ends with the predetermined position of the image capturing sensor on the focal plane.

It is also desirable for the movement of the lens to be achieved with maximum efficiency to facilitate ease of use and economy of space. This is especially important where there is motorization or automation of the focusing mechanism.

Many systems have evolved to move a lens along its optical axis without shifting or tilting. This invention concerns systems which consist of a fixed constraining frame and a moving focusing frame on which the lens is mounted. The focusing frame, constrained by the constraining frame, guides the lens along its optical axis.

FIG. 1A depicts a concentric sliding tube lens focusing system consisting of a rigid outer focusing tube and a rigid inner focusing tube. An outer focusing tube 01 serves as a rigid housing to which a fixed constraining frame 02 is attached. An inner focusing tube serves as a moving focusing frame 03. A lens 04 is mounted in the focusing frame 03. The focusing frame 03 slides in and out of the constraining frame 02. Movement in all other axes other than the optical axis are constrained. The lens 04 cannot shift or tilt on its optical axis. It does however rotate. This movement of the lens relative to the focal plane 05 achieves the desired lens focusing function of the system. An image capturing device such as a CCD or film can be situated on the focal plane 05. A simple example of such a focusing device can be found in a basic pirate's telescope.

In practice, if there is full contact between the outer cylindrical surface of the focusing frame 03 and the inner cylindrical surface of the constraining frame 02, a large amount of friction will be introduced into the system.

For this reason, such systems are built with contact points at the two ends to support the inner focusing tube and locate the optical axis. The rest of the facing surfaces do not need to be in contact. This eliminates the possibility of the inner focusing tube being supported inadvertently at some point between the two end points, thereby shortening the length of the constraining frame. It also reduces friction and allows one tube to slide freely inside the other. The outer support tube functions as a constraining frame, because only the two contact points at either end are used for supporting the inner tube. The tube is merely a convenient shape for the device. It is unnecessary and difficult to manufacture rigid concentric tubes of sufficient precision to slide in and out of each other with full contact.

The key to a smoothly working concentric tube focusing system is the ratio of the diameter of the constraining joint as defined by the focusing frame to the length of the constraining frame. It is the two points of support at the extreme ends of the constraining frame which do the work of keeping the inner focusing frame in place while it is being moved.

FIG. 1B depicts a modified version of the focusing system in FIG. 1A with a constraining frame 10, focusing frame 11 and lens 04. It is good practice to design the tubes so that the ratio in length (A) of the constraining frame 10 to the diameter (B) of a constraining joint 07 is approximately 7 to 1 or greater. Otherwise, the focusing frame 11 carrying the lens 04 can rock within the constraining frame 10. The result would be that the lens 04 can deviate from its ideal position on the optical axis. 12.

In fact, depending on the size of the gap between the concentric tubes functioning as a focusing frame 11 within a constraining frame 10, if the ratio of A/B approaches 1, which would be a short constraining frame length for a given constraining joint diameter, the focusing frame 11 can tilt so much within its constraining frame 10 that it will jam and not slide at all.

In theory, one can design a lens tube with a small constraining joint, a long constraining frame and long focusing frame, and this will be a very stable and accurate focusing system. In practice, the focusing system in FIG. 1B needs to function as part of an overall imaging device. The constraining frame and focusing frame need to accommodate peripheral as well as principal light paths entering the imaging device, passing through the lens, and falling on the focal plane. The longer the frames, the narrower the angle of view.

The designer of the overall imaging device will desire as much room as possible on either side of the lens, and as much flexibility in the angle of view as possible. This can only be achieved by making the constraining frame and focusing frame as short as possible in order to reduce the thickness of the imaging device. This inevitably leads to the problems with a concentric tube system jamming when the ratio of the length (A) of the constraining frame 10 and the diameter (B) of the constraining joint 07 is insufficient.

Another implementation of the fixed constraining frame and moving focusing frame method is depicted in FIG. 1C. A constraining frame 14 with a helical thread and a focusing frame 13 with a matching helical thread are combined to form a strong but movable constraining joint. This constraining joint is strong, and prevents tilt and shift of the lens because it provides axial support with each thread surface. The ratio of constraining frame 14 to the constraining joint can therefore be reduced. Focusing systems using a helical method can have a short outer constraining frame 14 and large inner focusing frame 13 (large constraining diameter). Such a system prevents tilt and shift, but the lens 04 and focusing frame 13 will rotate within the constraining frame 14.

One variation of the helical thread system uses a double helical thread and two anti-rotation pins to move the lens plane in and out without the lens rotating at the same time.

In the system using concentric tubes and helical threads, the lens 04 and the focusing frame 13 are situated inside the constraining frame 14. This is a limitation inherent to the system.

Any helical thread, by nature, introduces drag and inefficiency. This is because the outer moving surface must move a long distance in order for the lens to move a short distance. Also, the total contact area is much greater than for a concentric tube system, where the focusing frame is only supported at two ends.

A focusing system involving helical threads is inherently more difficult and expensive to make than one using concentric tubes. It requires accurately cutting two mating and interchangeable helical threads. This is not easy to mass-produce. Mass-production in plastic of such high precision male/female helical thread tubes would require highly expensive precision molding equipment.

An auto focus lens with helical thread requires a high precision fit in which there is no slack and the fit is not too tight. This helps reduce the power required to drive the focusing mechanism and extends battery life. This balance is very difficult to attain in production.

FIG. 2A is a side view of a slider-and-track based focusing system. A fixed constraining frame 15 is in the form of a pair of tracks which support and constrain a focusing frame 16, which is attached to and guides a lens tube 17, in which is mounted lens 04. The lens tube 17 has a clearance fit in the rigid outer focusing tube 01. The constraining frame 15 is fixed to the outer focusing tube 01, but is no longer concentric with it or the lens tube 17.

An axis 18 of the focusing frame 16 is parallel to the optical axis 12. The tracks which act as the constraining frame may be cylindrical as shown in FIG. 2A, but may also be in some other shape. There are also track-based focusing systems which only use a single track. The focusing frame 16 can be moved along the constraining frame 15 using various methods, such as a rack and pinion system.

The position of the constraining frame 15 in FIGS. 2A, 2B serves to separate the constraining and focusing frame mechanism from the lens 04. The lens no longer needs to be situated in a pair of concentric tubes, which in turn would have their diameter determined by the size of the lens. This means that within the limits imposed by materials and workmanship, it is possible to design a sliding track with a very small diameter (A) of the constraining joint as defined by the focusing frame 16 and a length (B) of the constraining frame 15 similar to the length B of the constraining frame 08 in FIG. 1A.

In a track-mount based focusing system, there is no rotation of the lens. Tilt and shift are prevented by means of the constraining frame being made of very strong material, and the constraining frame and constraining joint being very precisely engineered to have no slack on the constraining joint while still allowing the smooth movement. This balance is very difficult to attain in production. It would also require the use of materials much stronger than plastic.

SUMMARY OF THE INVENTION

An object of the invention is to provide a focusing system for lenses wherein a focusing frame is moved relative to a constraining frame which maintains the movement of the lens or lenses along their optical axis without subjecting the lens to any lateral, rotational or swing movement.

Another object of the present invention is to provide a focusing system for lenses where a focusing frame is moved relative to a constraining frame using only linear movements and no twisting motion.

Still a further object of the present invention is to provide a focusing system incorporating a focusing frame slotted with a constraining frame with two pairs of sliding joints.

Yet an additional object is to incorporate the foregoing objects in a three-dimensional focusing system.

A still additional object is to effect the foregoing objects in an effective and efficient manner.

The foregoing objects are achieved by means of a focusing frame fixed to a lens-holding focusing tube, and movably connected to a constraining frame. The focusing frame is connected to the constraining frame by prismatic joints (in the preferred embodiments, pin and hole joints and pin and open-slat joints are described) which constitute purely linear motion along the respective joint axis. The joints used in the preferred embodiments of the invention incur very low frictional force. There is no shifting, tilting or rotation (pitching or yawing) of the focusing frame as it moves relative to the constraining frame, so movement of the focusing frame is always along the optical axis of the lens.

BRIEF DESCRIPTION OF THE DRAWINGS

FIGS. 3A, 3B and 3C are respectively front, top cross-sectional and side cross-sectional schematic views of an embodiment of the invention.

FIGS. 3D and 3E are respectively front and side cross-sectional schematic views of a variation of the embodiment shown in FIGS. 3A-3C.

FIGS. 4A-4C are respectively front, side cross-sectional and top schematic views of another embodiment of the invention.

FIGS. 5A-5D are respectively top and side perspective, front, top and other side perspective and bottom side perspective schematic views of another embodiment of the invention.

DESCRIPTION OF THE PREFERRED EMBODIMENTS

Figure 1A:
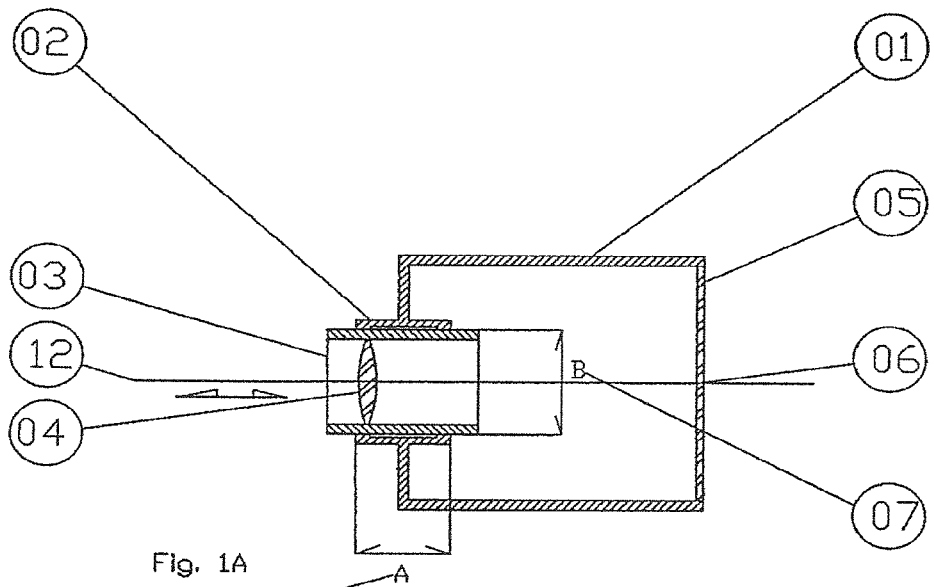
FIG. 1A is a cross-sectional schematic side view of a concentric sliding focusing system according to the prior art.

FIGS. 3A, 3B and 3C depict the invention in its most basic form.

In the concentric tube method, the outer tube is the constraining frame. It is fixed to the housing, and thereby provides support and rigidity to the focusing frame, which holds and constrains the motion of the lens along the required optical axis.

In FIGS. 3A, 3B and 3C, a constraining frame 19 is still part of a fixed housing. In fact, the entire housing functions as the constraining frame. This provides support and rigidity and constrains the motion of the lens 04 along the optical axis 12. However, this constraining frame 19 no longer supports and guides a long, thin inner focusing frame. Instead, the focusing frame is only represented by means of four focusing rails 20. (As used herein, the term "focusing rail" means a part fixed to the focusing frame, and the term "constraining rail" means a part fixed to the constraining frame.) Each focusing rail 20 has two freely sliding hole and pin joints 21. This means there are a total of four hole and pin joints 21 at each end of the constraining frame 19. The four hole and pin joints 21 at the far end from the lens 04 are formed by the end pieces of the focusing rails and bush pieces joined to the constraining frame 19. The other four hole and pin joints 21 are formed from pins joined to the inside wall of a focusing frame 23 and holes in the walls of the constraining frame 19. These four pairs of hole and pin joints 21 are constraining joints joining the focusing frame 23 to the constraining frame 19. Each hole and pin joint 21 allows the focusing rail to slide along an axis passing through the center of the hole, but rotation is prevented by the presence of the other focusing rails joined to the constraining frame 19 by the other pin and hole joints 21.

The lens tube 17, fixed to the focusing frame 23 consisting of four focusing rails 20, holding the lens 04 moves in and out of an opening in the fixed constraining frame 19, but the moving focusing frame, consisting of four focusing rails 20, wraps around the constraining frame 19 on the outside. The four focusing rails 20 are joined at the end close to the lens tube 17 to form a rigid focusing frame, which slides freely on the four pairs of free-moving pin and hole joints 21, guiding the lens 04 very accurately along the optical axis 12.

As described earlier, this provides sufficient support and accuracy for motion of the focusing frame relative to the constraining frame without engaging the entire surface area, which would unnecessarily increase friction in the device. It functions like a focusing rail 20, but derives its strength and freedom of movement from multiple joints with the constraining frame 19. Due to the long moment arm between the pairs of constraining joints, the reaction forces at the joints are correspondingly light. The frictional force becomes minute.

Figure 1B:
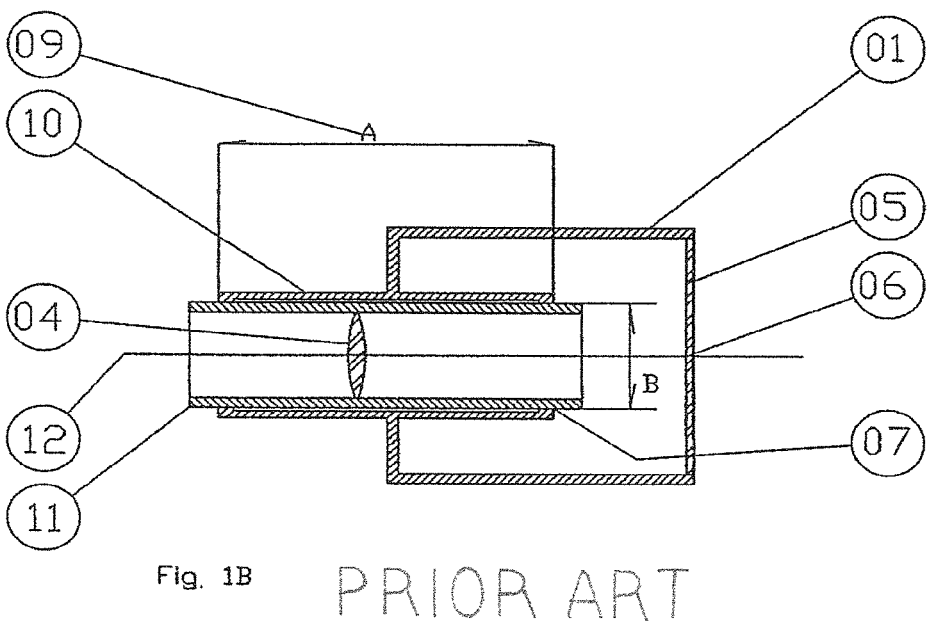
FIG. 1B is a variation of the view shown in FIG. 1A according to the prior art.
Figure 1C:
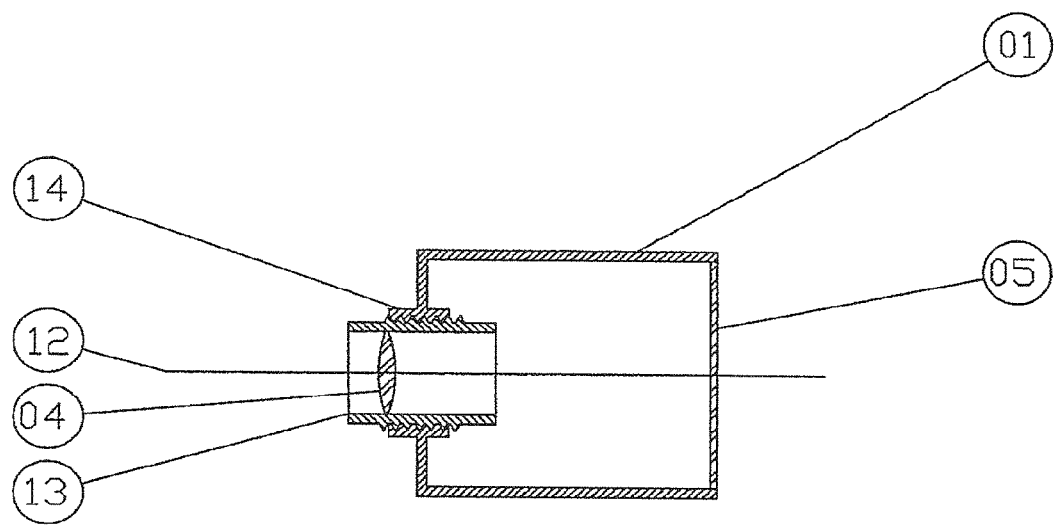
FIG. 1C is a cross-sectional schematic side view of a fixed constraining frame and a moving focusing frame being joined by matching helical threads according to the prior art.
Figures 2A, 2B:
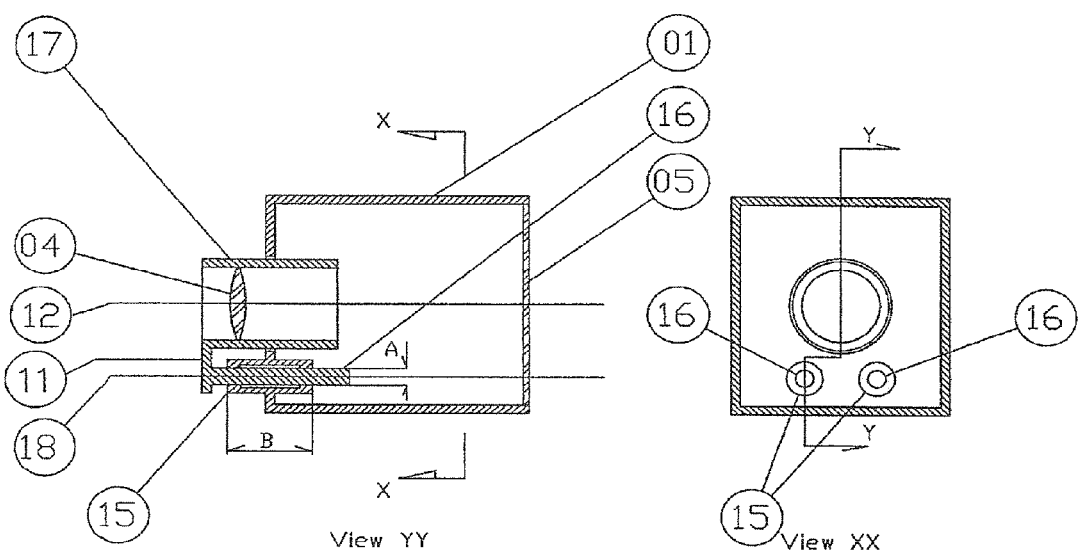
FIGS. 2A and 2B are cross-sectional schematic side and front sectional views of a slider-and-track based focusing system according to the prior art.

In FIGS. 3A-3C, the internal diameter of the constraining frame 19 is now represented by diameter (B), which is a fraction of the corresponding diameter (B) of the constraining frame 10 in FIG. 1B. The length of the constraining frame 19 is represented by length (A). The diameter (B) of constraining frame 19 can be very small and is only restricted by the need for rigidity of a pin sliding in its mating hole. By careful design, the length (A) of constraining frame 19 can be maximized by placing the contact joints between the constraining frame 19 and the focusing frame 23 made up of four focusing rails 20 at the extremes of the constraining frame 19 such that they move along axes which are parallel to the optical axis 12. This can be achieved without adding substantially to the overall length of the constraining frame 19.

As explained previously, a large ratio of the length (A) of the constraining frame to diameter (B) of the constraining frame gives rise to a focusing frame which does not tilt within its constraining frame and does not rock when sliding with respect to the support frame.

FIGS. 3D-3E depict another embodiment of the system using a constraining frame and four focusing rails. As described previously, the four focusing rails 20 in FIGS. 3A-3C are joined at the end close to the lens 04 to form a rigid focusing frame 23 which holds the lens tube 17 and lens 04.

The functionality and strength of the mechanism depicted in FIGS. 3A-3C can also be achieved in FIGS. 3D-3E by inverting the hole and pin joints 21 on the side close to the lens 04 such that the pins are joined to the constraining frame 19 and the holes are in the wall of the adjoining arm of the focusing frame 23.

The focal plane 05 can also be moved outside the housing, to the other side of the lens 04.

In FIGS. 4A-4C, two of the four focusing rails forming the focusing frame 23 have been taken away, leaving two at opposite sides of the constraining frame 19. This structure retains the long moment arm between pairs of constraining joints necessary to have a smooth travel. However, without the bracing pair of focusing rails at 90 degrees, it can pitch, or rotate about the Z-axis while it is moving. A rigid U-piece or constraining frame rails 28 is fitted to wrap around the constraining frame 19 and is pinned to the focusing frame 23, which it intersects on the top and bottom sides, by means of two slot and pin joints 31, which only permit limited sliding movement along the Z-axis. A frame around the constraining frame 19 is completed when the two arms of the U-piece 28 are linked up with a shaft 24 and pivoted on two rotating hole and pin joints 29 formed in conjunction with bush pieces in the wall of the constraining frame 19. The U-piece 28 is therefore linked to both the focusing frame 23 and the constraining frame 19.

The two slot and pin joints 31 prevent the focusing rails 20 making up the focusing frame 23 from pitching (rotating on the Z-axis) while it is moving. In FIG. 4C, the sliding hole and pin joints 21, 22 at either end of the focusing rails 20 making up the focusing frame 23 prevent the focusing frame from yawing (rotating on the Y-axis while it is moving).

In FIG. 5A, the rigid U-piece 28 in FIGS. 4A-4C has been split and is now represented by an upper right adjoining piece 32 joined to the upper end of a shaft 33 by a fixed upper left hole and pin joint 34 and a lower right joining piece 35 joined to the lower end of the same shaft 33 by a fixed lower left hole and pin joint 36. The shaft 33 on the right-hand side passes through two bush pieces 37 on the right-hand side of the constraining frame 19, which allows the combination U-piece on the right-hand side to freely pivot as if locked in a pin and hole joint. The upper right adjoining piece 32 is shaped like the letter "L," providing a long lever which can be used for pivoting the U-piece, comprised of the upper right adjoining piece 32, lower right adjoining piece 35 and shaft 33, in the bush pieces 37.

The rest of the U-piece is now represented by two identical levers, an upper lever 39 resting on the upper face of the constraining frame 19 and a lower lever 40 resting on the lower face. The right-hand side of the upper lever 39 is joined to the left-hand side of the upper right adjoining piece 32 by an upper pin and open slot joint 41. The right-hand side of the lower lever 40 is joined to the left-hand side of the lower right adjoining piece 35 by a lower pin and open slot joint 42.

The left-hand side of the upper lever 39 has a hole 43. The left-hand side of the lower lever 40 also has a hole 44. There are two bush pieces 45 on the left side of the constraining frame. The upper lever 39 is linked to the lower lever 40 by a shaft 46 on the left-hand side that passes through the holes 43 and 44 aforementioned and the two bush pieces 45. Depending on the application, the link between the shaft 46 on the left-hand side and the upper and lower levers 39 and item 40 can either be fixed for free floating.

In a working device such as an imaging device with a focusing lens, the far end of the upper right adjoining piece 32, which is shaped like a lever, has an index mark 47, which would point to a graduated focusing scale 48 as it is moved.

This would allow the user to control the focus of the device. The focusing scale 48 will work well as long as the focus markings are synchronized to the actual focal point 06 of the image forming lens 04. In real world mass-production, there is usually a range of focus points in any given sample of focusing lenses. Even a small discrepancy in the focus point 06 can lead to a misalignment of the index mark 47 on the lever with the focusing scale 48. To correct this problem, another embodiment of this invention provides an assembly-time method for trimming the focal point 06 of the focusing lens 04 to correct the focus discrepancy. To function properly, this focus trimming method must work independently of the main focusing lever, which is represented by the upper right adjoining piece 32.

Figure 5C:
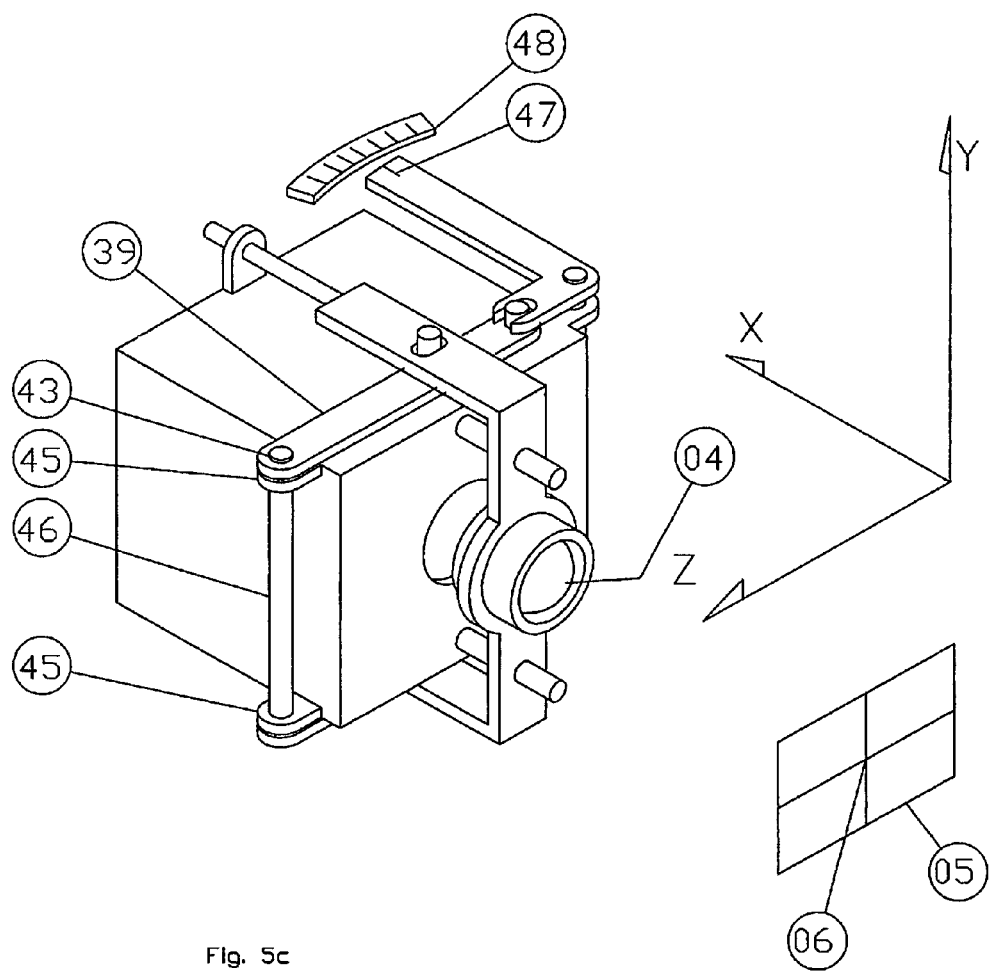
Figure 5D:
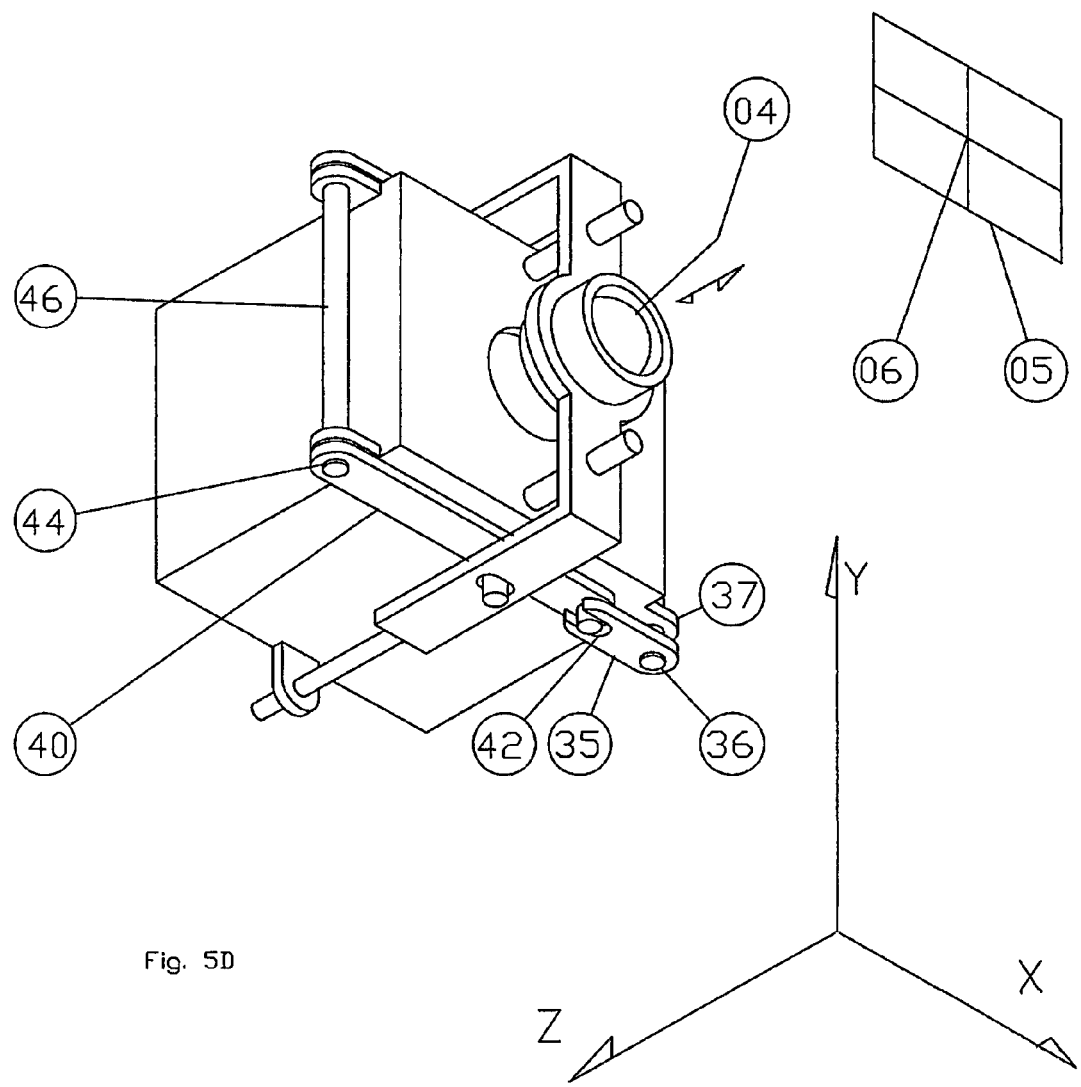
Figures 6A, 6B:
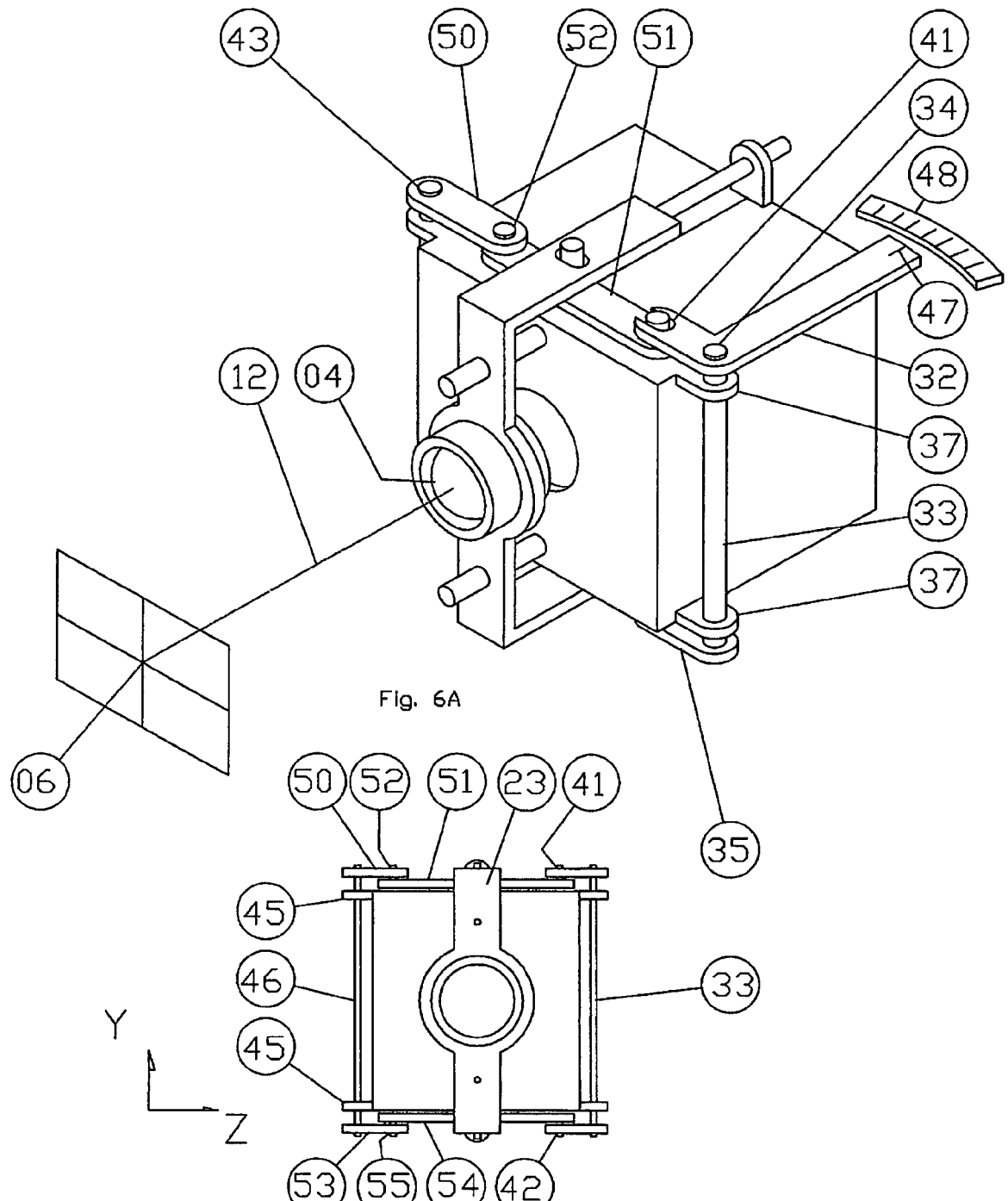
FIGS. 6A-6D are respectively top and side perspective, front, top and other side perspective and bottom side perspective schematic views of another embodiment of the invention.
Figure 6C:
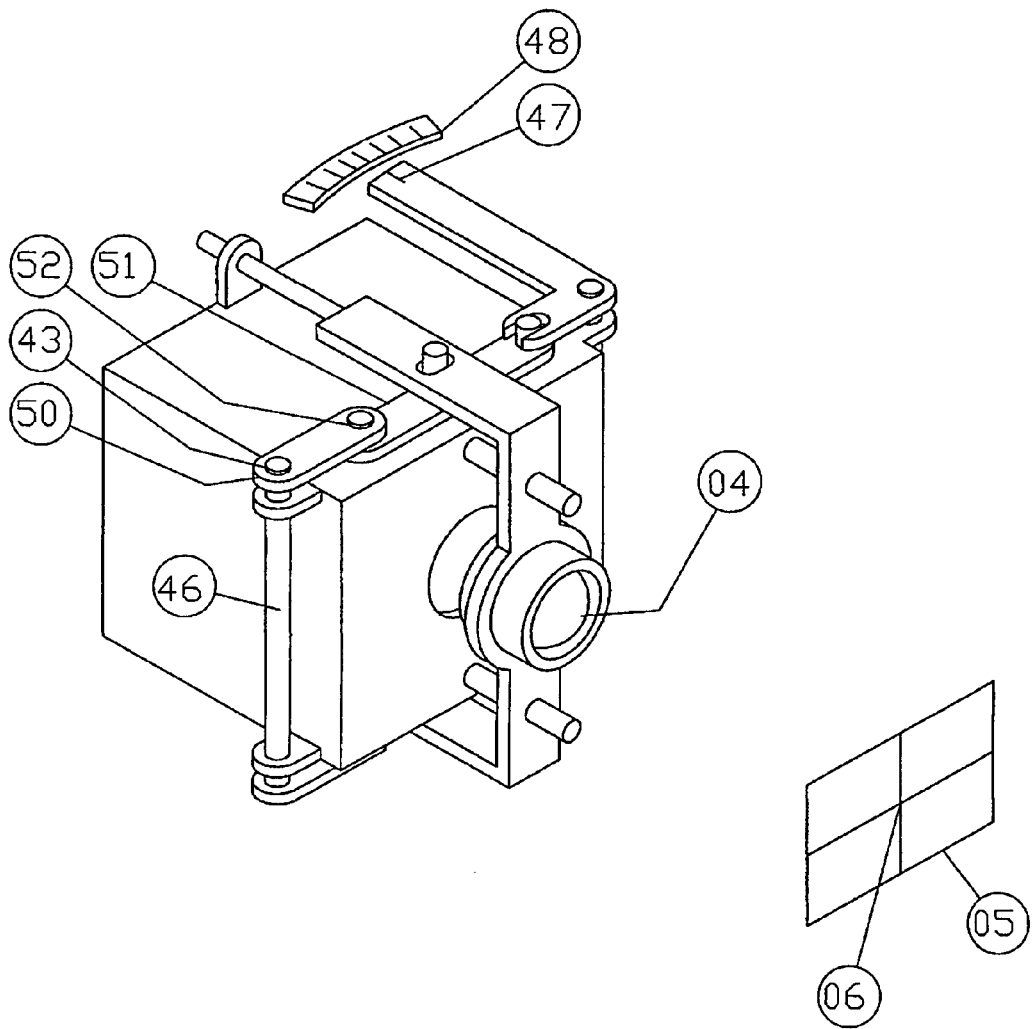
Figure 6D:
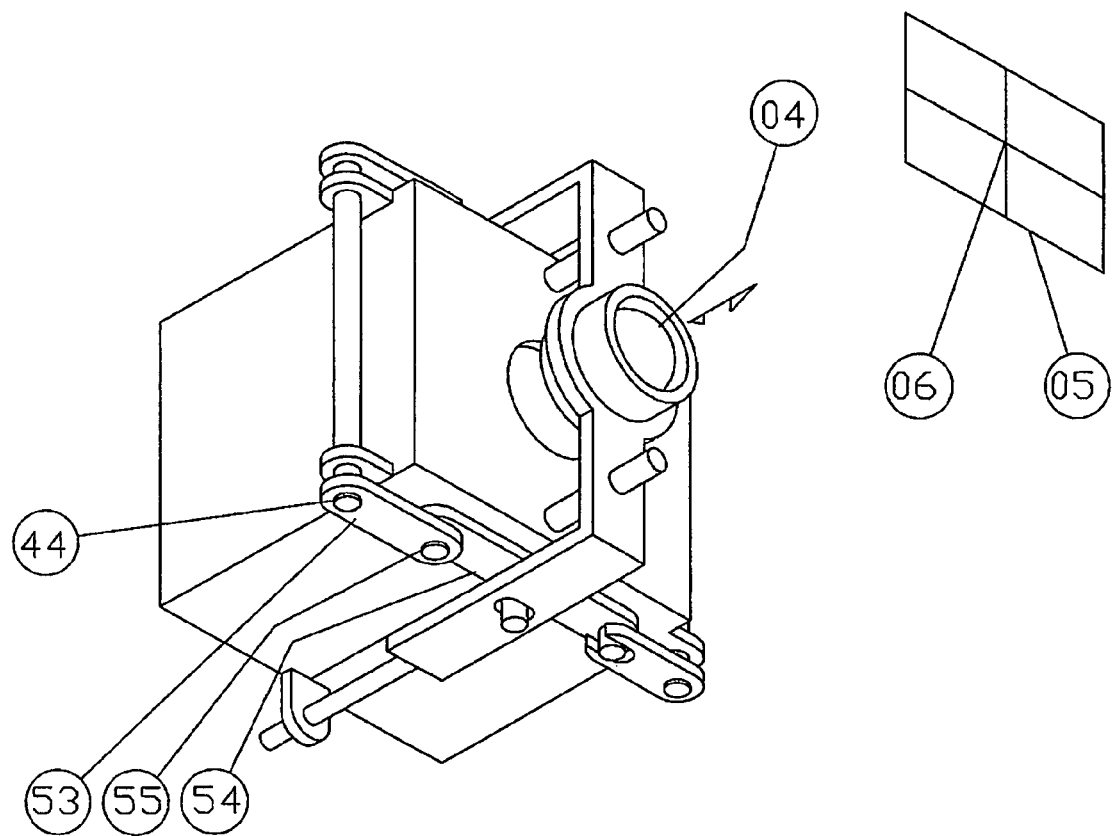

The upper lever in FIGS. 5A-5C is transformed in FIGS. 6A-6D into a short upper-left adjoining piece 50 and an upper differential piece 51 in the middle, which are joined by a rotating hole and pin joint 52. The lower lever 40 in FIGS. 5A-5C is transformed in FIGS. 6A-6D into a matching short lower-left adjoining piece 53 and lower differential piece 54 which are joined by another hole and pin joint 55.

In FIGS. 6A-6D, the short upper-left adjoining piece 50 is joined to a shaft 46 by a fixed upper hole and pin joint 43. The shaft 46 is passed through two bush pieces 45 joined to the constraining frame 19, in which it can freely rotate. The other end of the shaft is then joined to the short lower-left adjoining piece 53 by the fixed lower hole and pin joint 44. The combination of the left upper and left lower adjoining pieces 50, 53 and the shaft 46 on the left side becomes a truncated U-piece, which is rigid, but pivots within the constraining bush pieces 45.

The two truncated U-pieces described in FIGS. 5A-5D and FIGS. 6A-6D above, with a pair of upper and lower differentials 51, 54 in between, which prevent pitching of the focusing frame 23, provide two independent mechanisms for adjusting the focal point 06 of the lens 04. One mechanism, controlled by the focus lever, is used by the user to focus the lens according to the focus markings. The other mechanism, controlled by the position of the pair of differentials 51, 54, is used to trim the focal point of the lens 04 so that it matches the position of the focusing scale 48.

In FIGS. 6A-6D, the movement of the U-piece on the right, consisting of the upper right adjoining piece 32, shaft 33 on the right-hand side, and lower-right adjoining piece 35, causes the upper and lower differential pieces 51, 54 to move in sympathy, which in turn moves the focusing frame 23 along the optical axis 12. Movement of the U-piece on the left, comprised of the upper left adjoining piece 50, left-hand shaft 46 and lower-left adjoining piece 53, also causes the upper and lower differential pieces 51, 54 to move in sympathy, which in turn also moves the focusing frame 23 along the optical axis 12.

Figure 7:
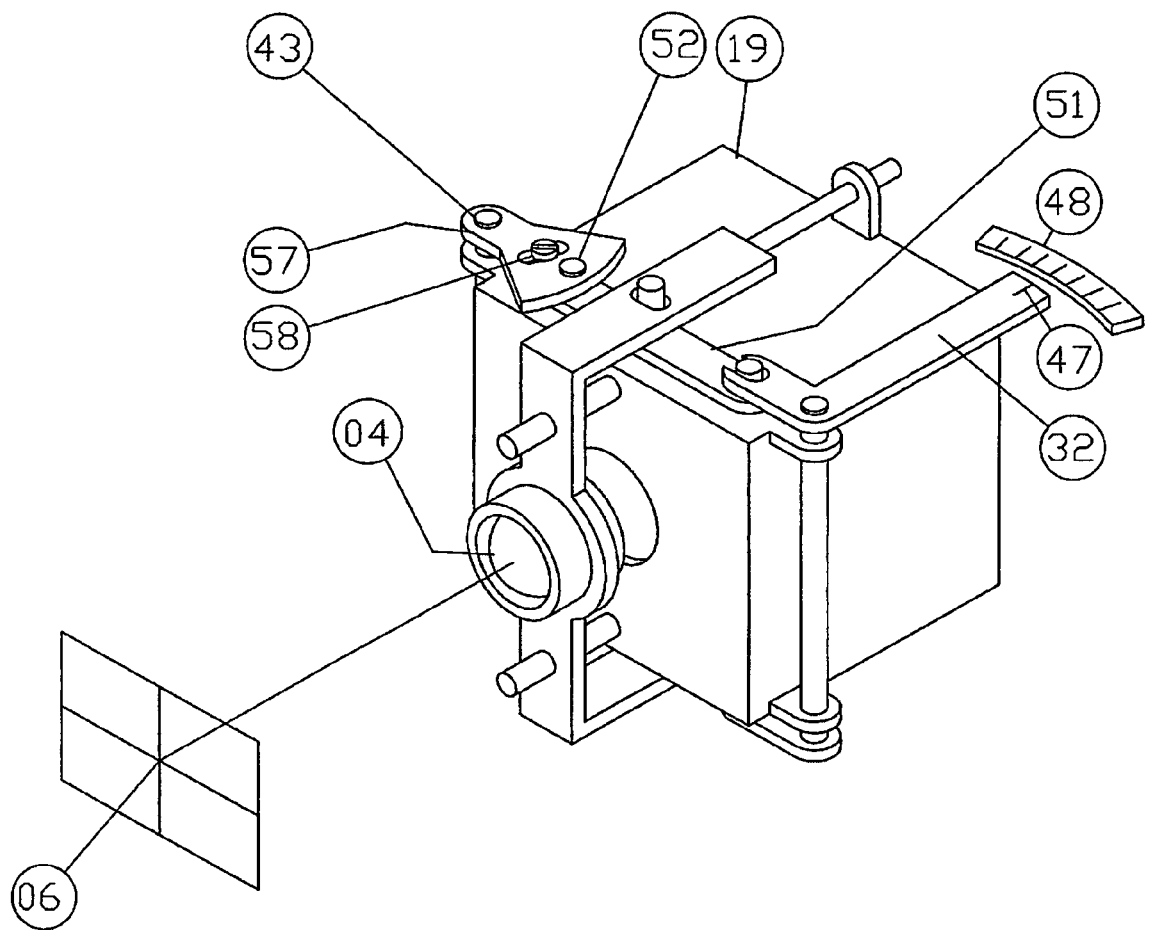
FIG. 7 is a top and side perspective schematic view of a variation of the embodiment shown in FIGS. 6A-6D.

For any given position of the focusing lever embodied by the upper-right adjoining piece 32, as determined by the focusing scale 48, the focal point 06 of the focusing lens 04 can be checked and trimmed by changing the position of the left-hand side U-piece. When the focusing lever is set to a given position, the upper and lower pin and open slot joints 41, 42 become two pivot points about which the pair of upper and lower mid-section differential pieces 51, 54 can pivot. Once the optimal position has been found, the left-hand side U-piece can be locked down, and the focus trim of the lens unit fixed to coincide with the preset focusing scale 48, as shown in FIG. 7.

In another embodiment of the invention, the freely rotating truncated U-piece on the left is made adjustable and lockable. As shown in FIG. 7, the upper left adjoining piece 50 in FIGS. 6A-6D is transformed into a quadrant-shaped adjustment piece 57. The quadrant-shaped adjustment piece 57 is provided with a screw-and-track locking mechanism 58 in between the upper left hole and pin joint 43 and the rotating hole and pin joint 52 joining the quadrant-shaped adjustment piece 57 to the upper differential piece 51. The potential arc of movement of the left-hand side U-piece is constrained by the arc-shaped track in the quadrant-shaped adjustment piece 57. The screw in the screw-and-track locking mechanism 58 is screwed into the constraining frame 19 and can be tightened to clamp the position of the focus trim once it has been determined.

A 3D imaging device works by simulating a pair of human eyes in providing a pair of image capturing lenses to capture a pair of images of the same object from different angles. The difference in the apparent position of the object as seen from different angles is known as parallax. The human brain processes the image pair with parallax, and stereoscopic vision is the result.

When the object is relatively far away, the incident light paths entering the pair of eyes are almost parallel, so the person looks straight ahead. When the object is relatively close, the incident light paths entering the pair of eyes will have to be at an angle to the centerline of the object with respect to the pair of eyes. While focusing on a close-up object, the pair of eyes will naturally swivel so that the optical axis of each eye converges toward the object and allows each image to be centered on the focal plane. This is known as parallax compensation.

When a basic 3D imaging device is focused on a close-up object, the incident light paths entering the image-capturing lens or lenses will also be at an angle to the centerline of the object with respect to the imaging device. When the 3D imaging device is head on to the object, both images in the pair captured will not be centered on the optical axis. If the device is rotated so that one image in the pair is centered on the optical axis of the image-capturing plane on one side, then the other image will be even further de-centered from the optical axis of the image-capturing plane on the other side. In a real world 3D imaging device, the disadvantage of this is that one or both images in the pair will be inappropriately cropped, and a lot of image information is lost on one or both sides.

This invention teaches a new focusing mechanism for a 3D imaging device and a method for linking this focusing mechanism to another mechanism for varying the angle of one or both optical axes in order to allow the device to simulate the parallax compensation function of a pair of human eyes.

Figure 8A:
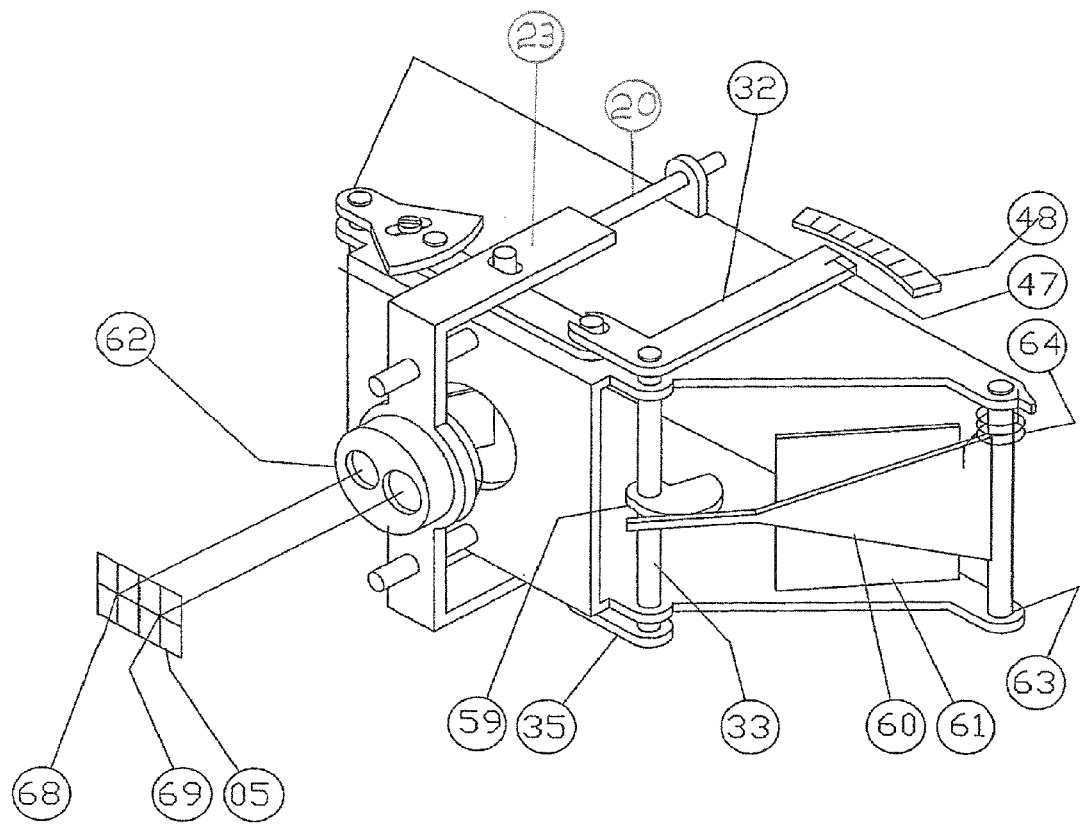
FIGS. 8A-8D are respectively top and side perspective, top, top cross-sectional and another top cross-sectional views of another embodiment of the invention.
Figure 8B:
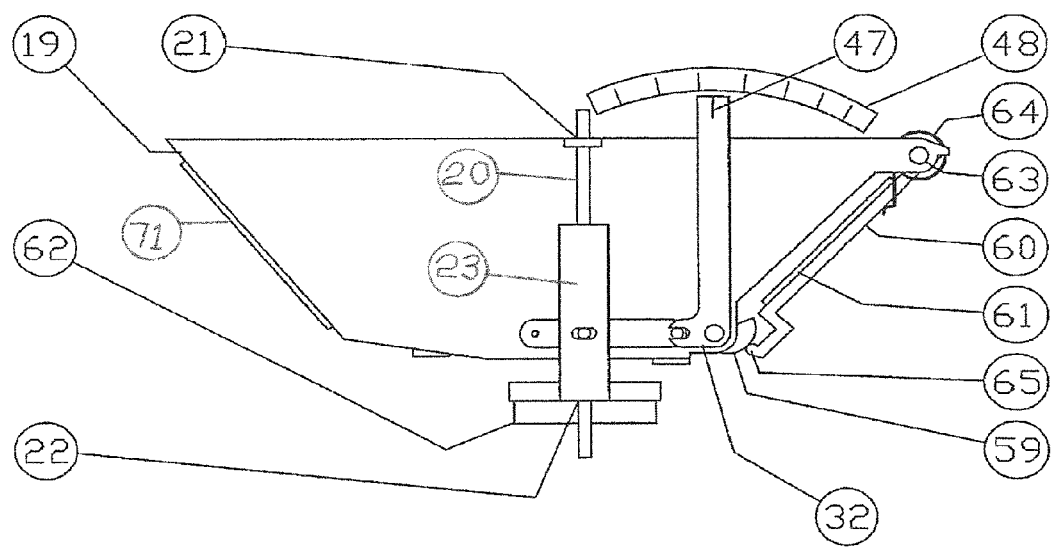

FIGS. 8A and 8B show another embodiment of the invention. The right-hand side U-piece, consisting of the upper-right adjoining piece 32, shaft 33 on the right-hand side, and lower-right adjoining piece 35, can have a cam 59 attached to the shaft 33 to impart coordinated movement to other mechanical frameworks, such as a mirror holder 60. Adjustment of focus is tracked by means of a marked focusing scale 48 and achieved through movement of the right-hand side U-piece. This changes the angle of an adjustable mirror 61 which is mounted on an adjustable mirror holder 60 at the same time, which changes the optical axis of the image-capturing framework on the right-hand side. The same movement of the right-hand side U-piece can be linked to more than one adjustable mirror at the same time.

Figure 8C:
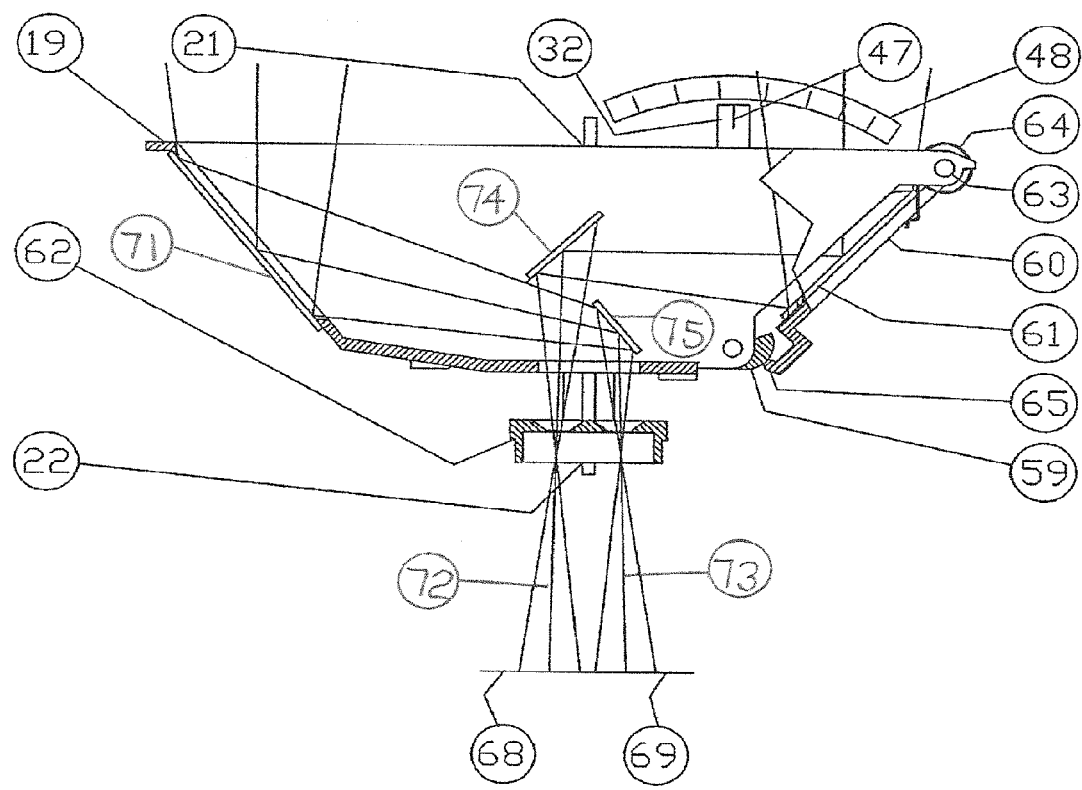

FIG. 8C is a sectional view of a typical 3D imaging device with a twin lens assembly 62 and four light deflection mirrors, which define two image-capturing frameworks situated some distance apart, each with an optical axis 72, 73 independent of the other. In FIG. 8C, one of the four deflection mirrors is the adjustable mirror 61 in FIGS. 8A-8B, mounted in a mirror holder 60, pivoting on a hinge joint 63. A mirror 74 reflects light to mirror 61, and a mirror 75 reflects light to mirror 71. The focusing lever as embodied by the upper-right adjoining piece 32 controls the focus of the twin lens assembly 62 and, at the same time, imparts coordinated movement to the adjustable mirror 61 through the cam 59. A spring 64 is keyed on the mirror holder 60 and reacts against the constraining frame 19 to impart a force to ensure that a cam follower 65, situated at the tip of the mirror holder 60, always engages on the cam 59.

The link between the focusing lever as embodied by the upper-right adjoining piece 32 and the adjustable mirror 61 can be calibrated such that the position of the image formed by the adjustable image-capturing framework on the focal plane can be used to indicate the position of the focusing lever and, hence, determine the distance of the object from the imaging device. If the image formed by the adjustable image-capturing framework is viewed in a calibrated optical or digital viewfinder, then the device becomes a rangefinder. This functionality can be achieved with or without the use of electronic components in the device.

Figure 8D:
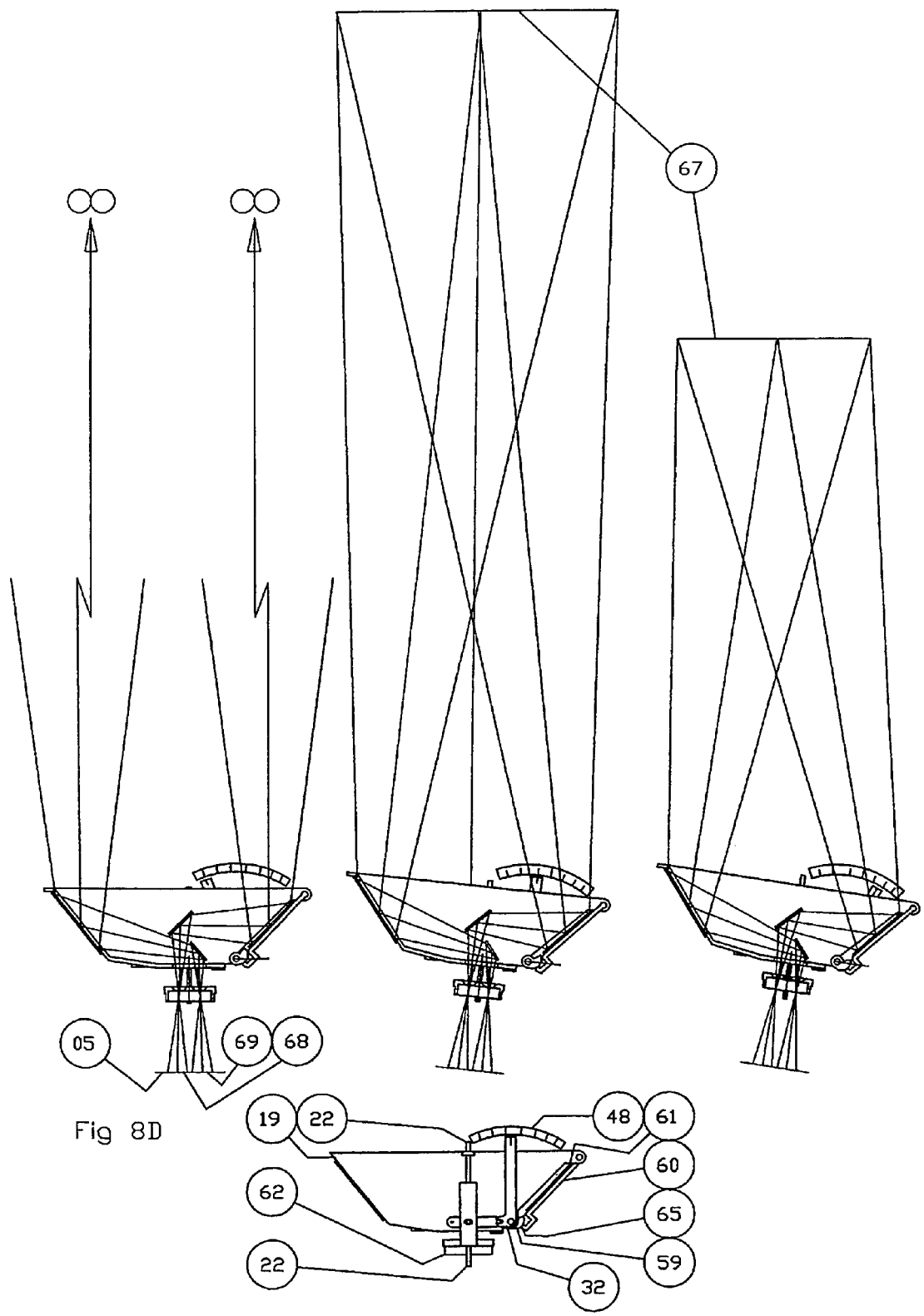

In 3D photography, an object can be represented as an object plane which has width and different views when photographed from two image-capturing frameworks set apart from each other. In FIG. 8D, sectional views are shown of the 3D imaging device of FIG. 8C with light paths depicting an object plane at infinity, mid-distance and close up. An insert of FIG. 8D is also provided for clarity of illustration to show the numbered parts whose positions change in the three diagrams with light paths.

In a 3D imaging device, the image formed by the adjustable image-capturing framework and the image formed by the other image-capturing framework will be viewable side-by-side in an optical or digital viewfinder built into the image-capturing device. This pair of images 68, 69 is first captured on the focal plane 05. The relative position of this pair of images 68, 69 will indicate whether an object plane 67 is situated at a point on the center axis of the image-capturing device where the optical axes of the two image-capturing frameworks converge.

In FIG. 8D, when the object plane 67 is situated at this point, it will automatically be in focus. In real life, the object plane 67 may not move to coincide with the point where the two optical axes happen to converge. So, in a 3D imaging device, the two optical axes are made to pivot relative to each other so that the point of convergence can be found. This behavior imparts coupled focus-finding capability to the device. This functionality can be achieved with or without the use of electronic components in the device.

In practice, the 3D imaging device and adjustable mirror only needs to tilt relative to the centerline and to each other by a very small amount for parallax compensation to be effected. This almost imperceptible displacement is very difficult to display on an accurately scaled drawing. The relative displacements shown in the drawings are exaggerated for clarity of illustration.

Also, in practice, the relative length of each adjoining piece forming the U-piece may vary. All directional and positional references such as to the left, right, upper, lower, front, back, and all references to relative length and size are for the ease of understanding of the figures. In other embodiments, the items referenced can be moved to other positions, or transformed into different shapes, or swapped with corresponding items on the other side, and relative sizes and lengths may be varied as long as the basic principles described above are applied.

The invention has been described in detail with particular emphasis being placed on the preferred embodiments, but variations and modifications may occur to those skilled in the art to which the invention pertains.

I claim:

1. A 3-D focusing system for a 3-D camera, said 3-D focusing system comprising:
    a focusing frame;
    a twin lens assembly including a pair of lenses mounted in said focusing frame, said pair of lenses having a pair of parallel optical axes;
    a first pair of mirrors, each located on a different one of the parallel optical axes of said pair of lenses, said first pair of mirrors being fixed, each of said first pair of mirrors being tilted to reflect light in a generally opposite direction across the optical axis of the other of said lenses;
    a second pair of mirrors, each of said second pair of mirrors being in the path of reflection of a different one of said first pair of mirrors and located on the opposite side of said optical axes from a mirror of said first pair of mirrors from which said respective mirror of said second pair of mirrors receives reflective light, said second pair of mirrors being tilted to reflect light in the general direction of an object plane, at least one of said second pair of mirrors being adjustable to change the tilt of said at least one of said second pair of mirrors to change the angle of reflection of light impinging on said at least one adjustable mirror;
    an adjusting structure operably connected to both said focusing frame and said at least one adjustable mirror, said adjusting structure simultaneously moving said focusing frame along said parallel optical axes and said at least one adjustable mirror, and adjusting the tilt of said at least one adjustable mirror to vary the direction of at least one of the optical axes of the light transmitted through at least one of the pair of lenses and directed toward the at least one adjustable mirror to capture a pair of images focused on the object plane from different angles to perform parallax compensation to eliminate double vision.

2. A 3-D focusing system according to claim 1 wherein said second pair of mirrors comprises a fixed mirror tilted to reflect light from the lens transmitting light to said fixed mirror of said second pair of mirrors towards the optical axes of said pair of lenses, and an adjustable mirror, said adjustable mirror being adjustable to change the tilt of said adjustable mirror to change the angle of reflection of light impinging on said adjustable mirror;
    wherein said adjusting structure is operably connected to both said focusing frame and to said adjustable mirror.

3. A 3-D focusing system according to claim 1 and further comprising:
    a constraining frame for holding said twin lens assembly, said first pair of mirrors, said second pair of mirrors and said adjusting structure, said constraining frame having opposing first and second sides on opposite sides of parallel optical axes and being parallel to said parallel optical axes, and opposing third and fourth sides on opposite sides of said parallel optical axes, said third and fourth sides being transverse to said first and second sides; said twin lens assembly, said at least one adjustable mirror and said adjusting structure being movably mounted on said constraining frame; and
    an adjustable mirror holder for holding each of said at least one adjustable mirror;

wherein said adjusting structure comprises:
- a first adjoining piece proximate said first side of said constraining frame;
- a second adjoining piece proximate said second side of said constraining frame and opposite said first adjoining piece;
- a first shaft joining said first and second adjoining pieces and rotatably mounted on said constraining frame;
- adjustment structure interconnecting said first shaft and said adjustable mirror holder;
- a first differential piece proximate said first side of said constraining frame and being pivotally connected to said first adjoining piece;
- a second differential piece proximate said second side of said constraining frame and being pivotally connected to said second adjoining piece;
- a third adjoining piece proximate said first side of said constraining frame and being pivotally connected to said first differential piece;
- a fourth adjoining piece proximate said second side of said constraining frame and being pivotally connected to said second differential piece;
- a second shaft parallel to said first shaft and joining said third adjoining piece and said fourth adjoining piece; and
- a focusing rail fixed to said focusing frame and being slidably mounted on said constraining frame for sliding movement parallel to said optical axes for changing the object plane of said pair of lenses; said focusing frame being pivotably connected to said first differential piece and said second differential piece;
- said focusing frame effecting the movement of said first and second differential pieces to rotate said first and second shafts to move said adjusting structure and to move said mirror holder to move said at least one adjustable mirror to capture a pair of images focused on said object plane from different angles to perform parallax compensation to eliminate double vision.

\* \* \* \* \*